(12) United States Patent
Schäfer et al.

(10) Patent No.: US 7,862,119 B2
(45) Date of Patent: Jan. 4, 2011

(54) VEHICLE SEAT WITH LORDOSIS SUPPORT

(75) Inventors: Rolf Schäfer, Ehinen (DE); Torsten Aeugle, Wettelsheim (DE); Andrew Massara, Birmingham, MI (US); Jürgen Hofmockel, Ansbach (DE); Wolfram-H. Hofschulte, Bonndorf (DE); Urban Knöpfle, Titisee-Neustadt (DE); Michael Wöhrle, Niedereschach (DE)

(73) Assignee: Alfmeier Prazision Ag Baugruppen und Systemlosungen, Treuchtlingen (DE)

( * ) Notice: Subject to any disclaimer, the term of this patent is extended or adjusted under 35 U.S.C. 154(b) by 239 days.

(21) Appl. No.: 11/911,026

(22) PCT Filed: Apr. 8, 2006

(86) PCT No.: PCT/EP2006/003224

§ 371 (c)(1),
(2), (4) Date: Mar. 7, 2008

(87) PCT Pub. No.: WO2006/105989

PCT Pub. Date: Oct. 12, 2006

(65) Prior Publication Data

US 2008/0238123 A1 Oct. 2, 2008

Related U.S. Application Data

(63) Continuation of application No. 11/101,827, filed on Apr. 8, 2005, now abandoned.

(30) Foreign Application Priority Data

Aug. 5, 2005 (DE) ........................ 10 2005 036 936

(51) Int. Cl.
*B60N 2/66* (2006.01)

(52) U.S. Cl. .................................. 297/284.8
(58) Field of Classification Search ............. 297/284.4, 297/284.8, 284.7
See application file for complete search history.

(56) References Cited

U.S. PATENT DOCUMENTS 134,853 A    1/1873    Cliff (Continued)

FOREIGN PATENT DOCUMENTS

DE    1111965    7/1961

(Continued)

*Primary Examiner*—Joseph Edell
(74) *Attorney, Agent, or Firm*—Dority & Manning, P.A.

(57) ABSTRACT

The invention relates to a vehicle seat with a back rest having a frame (2) and a lordosis support (6), with the following additional configuration: The lordosis support (6) comprises a pressure plate (9) that is essentially bend resistant in at least the transverse direction of the seat or the Y-direction, forms a supporting surface in the lordosis region of the back rest and is arranged between two side frame parts (3) of the frame (2); there is at least one holding element (5a, 5b) that extends between the side frame parts (3) with a length-variable adjustment section (21), which runs in the Y-direction and connects to the pressure plate (9), and is affixed there at fixing points (30) arranged opposite each other; in an inoperative position, the pressure plate (9) is arranged with a horizontal clearance (11) or a clearance in the X-direction behind the fixing points (30); there is a driving device with which the length of the adjustment section can be shortened as the horizontal clearance is reduced.

19 Claims, 12 Drawing Sheets

U.S. PATENT DOCUMENTS

| | | | |
|---|---|---|---|
| 162,166 A | 4/1875 | Godley |
| 759,507 A | 5/1904 | Ericson et al. |
| 1,153,058 A | 9/1915 | Gilfillan |
| 1,273,953 A | 7/1918 | Torano |
| 2,812,804 A | 11/1957 | Sandor |
| 2,903,043 A | 9/1959 | Kenney |
| 3,145,054 A | 8/1964 | Sopko |
| 3,348,880 A | 10/1967 | Swann |
| 3,581,322 A | 6/1971 | Marsico |
| 3,762,769 A | 10/1973 | Poschl |
| 3,797,886 A | 3/1974 | Griffiths |
| 3,899,210 A | 8/1975 | Samhammer et al. |
| 3,974,827 A | 8/1976 | Bodeen |
| 4,108,492 A | 8/1978 | Kirby |
| 4,124,252 A | 11/1978 | Safir |
| 4,138,235 A | 2/1979 | Turner |
| 4,276,666 A | 7/1981 | Yamada |
| 4,295,681 A | 10/1981 | Gregory |
| 4,313,637 A | 2/1982 | Barley |
| 4,339,150 A | 7/1982 | McNamara et al. |
| 4,357,725 A | 11/1982 | Ahlm |
| 4,400,817 A | 8/1983 | Sumner |
| 4,452,485 A | 6/1984 | Schuster |
| 4,497,517 A | 2/1985 | Gmeiner et al. |
| 4,516,568 A | 5/1985 | Baxter et al. |
| 4,539,057 A | 9/1985 | Ahlm |
| 4,554,693 A | 11/1985 | Calloway |
| 4,555,140 A | 11/1985 | Nemoto |
| 4,564,235 A | 1/1986 | Hatsutta et al. |
| 4,567,615 A | 2/1986 | Fanti |
| 4,577,358 A | 3/1986 | Glass |
| 4,607,403 A | 8/1986 | Alivizatos |
| 4,619,481 A | 10/1986 | Grudzinskas |
| 4,629,253 A | 12/1986 | Williams |
| 4,634,176 A | 1/1987 | Scott |
| 4,636,000 A | 1/1987 | Nishino |
| 4,706,313 A | 11/1987 | Murphy |
| 4,715,653 A | 12/1987 | Hattori et al. |
| 4,720,146 A | 1/1988 | Mawbey et al. |
| 4,725,095 A | 2/1988 | Benson et al. |
| 4,736,587 A | 4/1988 | Suzuki |
| 4,754,511 A | 7/1988 | Sargent |
| 4,757,564 A | 7/1988 | Goodale |
| 4,775,185 A | 10/1988 | Scholin et al. |
| 4,789,202 A | 12/1988 | Alter |
| 4,809,375 A | 3/1989 | Bull |
| 4,819,278 A | 4/1989 | Ramos |
| 4,862,536 A | 9/1989 | Pruit |
| 4,880,271 A | 11/1989 | Graves |
| 4,924,541 A | 5/1990 | Inagaki |
| 4,932,429 A | 6/1990 | Watanabe et al. |
| 4,955,666 A | 9/1990 | Baker |
| 4,973,024 A | 11/1990 | Homma |
| 4,979,672 A | 12/1990 | Abu Judom, II et al. |
| 5,050,930 A | 9/1991 | Schuster et al. |
| 5,076,643 A | 12/1991 | Colasanti et al. |
| 5,079,787 A | 1/1992 | Pollmann |
| 5,096,529 A | 3/1992 | Baker |
| 5,103,517 A | 4/1992 | Krouskop |
| 5,111,544 A | 5/1992 | Graebe |
| 5,127,119 A | 7/1992 | Rogers |
| 5,129,707 A | 7/1992 | Yamauchi |
| 5,174,526 A | 12/1992 | Kanigowski |
| 5,190,348 A | 3/1993 | Colasanti |
| 5,197,780 A | 3/1993 | Coughlin |
| 5,211,371 A | 5/1993 | Coffee |
| 5,279,237 A | 1/1994 | Allvizatos |
| 5,317,768 A | 6/1994 | Klancnik |
| 5,319,814 A | 6/1994 | Dyer, Jr. |
| 5,325,880 A | 7/1994 | Johnson et al. |
| 5,345,963 A | 9/1994 | Dietiker |
| 5,397,164 A | 3/1995 | Schuster et al. |
| 5,423,593 A | 6/1995 | Nagashima |
| 5,449,219 A | 9/1995 | Hay et al. |
| 5,462,335 A | 10/1995 | Seyler |
| 5,474,358 A | 12/1995 | Maeyaert |
| 5,491,854 A | 2/1996 | Music |
| 5,498,063 A | 3/1996 | Schuster et al. |
| 5,505,520 A | 4/1996 | Frusti et al. |
| 5,513,402 A | 5/1996 | Schwartz |
| 5,553,919 A | 9/1996 | Dennis |
| 5,567,011 A | 10/1996 | Sessini |
| 5,573,302 A | 11/1996 | Harrison et al. |
| 5,609,394 A | 3/1997 | Ligon, Sr. et al. |
| 5,649,739 A | 7/1997 | Zapf |
| 5,651,584 A | 7/1997 | Chenot et al. |
| D383,928 S | 9/1997 | Earleywine, Jr. |
| 5,680,662 A | 10/1997 | Purdy et al. |
| 5,704,687 A | 1/1998 | Klingler |
| 5,733,012 A | 3/1998 | Jones |
| 5,762,397 A | 6/1998 | Venuto et al. |
| 5,769,490 A | 6/1998 | Falzon |
| 5,788,328 A | 8/1998 | Lance |
| 5,802,643 A | 9/1998 | Sloot |
| 5,802,646 A | 9/1998 | Stolpmann et al. |
| 5,806,927 A | 9/1998 | Schneider |
| 5,823,620 A | 10/1998 | Le Caz |
| 5,826,312 A | 10/1998 | Schroder et al. |
| 5,836,647 A | 11/1998 | Turman |
| 5,910,081 A | 6/1999 | Graham |
| 5,911,477 A | 6/1999 | Mundell et al. |
| 5,913,569 A | 6/1999 | Klingler |
| 5,937,464 A | 8/1999 | Niederman |
| 5,954,399 A | 9/1999 | Hong |
| 5,967,608 A | 10/1999 | Van Sickle |
| 5,975,568 A | 11/1999 | Speckhart et al. |
| 6,003,941 A | 12/1999 | Schuster, Sr. et al. |
| 6,019,420 A * | 2/2000 | Faust et al. ............ 297/180.14 |
| 6,045,185 A | 4/2000 | Ligon, Sr. et al. |
| 6,053,064 A | 4/2000 | Gowing et al. |
| 6,056,360 A | 5/2000 | Schneider |
| 6,092,871 A | 7/2000 | Beaulieu |
| 6,113,141 A | 9/2000 | Baker |
| 6,152,531 A | 11/2000 | Deceuninck |
| 6,227,617 B1 | 5/2001 | von Moller |
| 6,227,618 B1 | 5/2001 | Ligon, Sr. et al. |
| 6,338,530 B1 | 1/2002 | Gowing |
| 6,412,868 B1 | 7/2002 | Kuster et al. |
| 6,430,801 B1 | 8/2002 | Cosentino |
| 6,499,806 B2 | 12/2002 | Nagayasu et al. |
| 6,499,807 B1 | 12/2002 | Kaneda et al. |
| 6,557,938 B1 | 5/2003 | Long |
| 6,595,585 B2 | 7/2003 | Mundell |
| 6,601,919 B1 | 8/2003 | Deceuninck |
| 6,619,739 B2 | 9/2003 | McMillen |
| 6,637,824 B1 | 10/2003 | Yokota |
| 6,652,028 B2 | 11/2003 | McMillen |
| 6,652,029 B2 | 11/2003 | McMillen |
| 6,676,214 B2 | 1/2004 | McMillen et al. |
| 6,736,461 B2 | 5/2004 | Blair et al. |
| 6,758,522 B2 | 7/2004 | Ligon |
| 6,779,844 B2 | 8/2004 | Dosen |
| 6,805,411 B2 | 10/2004 | Gramss et al. |
| 6,814,407 B2 | 11/2004 | Mundell |
| 6,824,214 B2 | 11/2004 | McMillen |
| 6,908,152 B2 | 6/2005 | McMillen |
| 6,938,955 B2 | 9/2005 | VanSickle |
| 7,011,369 B2 | 3/2006 | Massara et al. |
| 7,036,864 B2 | 5/2006 | Rehfuss et al. |
| 7,201,446 B2 | 4/2007 | Massara et al. |
| 2003/0006636 A1 | 1/2003 | Ligon, Sr. et al. |
| 2003/0111884 A1 | 6/2003 | Dosen et al. |
| 2003/0111885 A1 | 6/2003 | McMillen |
| 2003/0173806 A1 | 9/2003 | McMillen |

| | | |
|---|---|---|
| 2003/0227203 A1 | 12/2003 | Mundell |
| 2005/0023873 A1 | 2/2005 | Massara et al. |
| 2005/0023878 A1 | 2/2005 | Kluehspies |
| 2005/0280299 A1 | 12/2005 | Vogt et al. |
| 2006/0061168 A1 | 3/2006 | Massara et al. |

FOREIGN PATENT DOCUMENTS

| | | |
|---|---|---|
| DE | 2420277 | 11/1975 |
| DE | 3619118 | 12/1987 |
| DE | 3620084 | 12/1987 |
| DE | 10345400 | 5/2002 |
| EP | 0296038 | 12/1988 |
| EP | 0420824 | 4/1991 |
| EP | 0518830 | 12/1992 |
| EP | 0540481 A1 * | 5/1993 |
| EP | 0582821 | 2/1994 |
| EP | 1502808 | 2/2005 |
| EP | 1502809 | 2/2005 |
| FR | 2596334 | 10/1987 |
| GB | 1365348 | 9/1974 |
| GB | 2012569 | 8/1979 |
| GB | 2316459 | 2/1998 |
| WO | WO 02092385 | 11/2002 |
| WO | WO 03095262 | 11/2003 |

* cited by examiner

VEHICLE SEAT WITH LORDOSIS SUPPORT

FIELD OF THE INVENTION

The invention relates to a vehicle seat with lordosis support.

BACKGROUND

A lordosis support is a device arranged near the surface in the back rest of a seat, with which the contour of the back rest can be adjusted in the lordosis region of the user. For this purpose, air bubbles, which can be inflated or deflated in order to adjust the seat contour, are frequently arranged under the upholstery of the back rest. There are also existing mechanical solutions, that is, those that adjust the contour of the seat by purely mechanical means, as in the vehicle seats disclosed in U.S. Pat. Nos. 6,601,919 B1, 5,474,358, 6,767,214 B2, 6,814,407 B2, and 6,652,028 B2. The known vehicle seats have a supporting element in the lordosis region behind the back rest cushioning. This is curved in either the transverse or longitudinal direction of the seat by a motor-driven device that is generally aided by a Bowden cable. By this means, the original seat contour, that is, its non-curved state, is changed considerably, which is often not desirable. Another disadvantage is that, due to its curving, the supporting element causes a relative movement to the cushioning, as, for example, in the case of U.S. Pat. No. 6,814,407 B2. In the vehicle seat described therein, a supporting element extends in the transverse direction of the seat. The curving is achieved by bringing the ends of the supporting element close together using a Bowden cable, and this necessarily causes a relative movement to the back-rest cushioning.

SUMMARY

The task of the disclosure is to propose a vehicle seat with lordosis support in which the seat contour is adjusted in the lordosis region using alternative means, thereby avoiding the specified disadvantages.

This task is fulfilled by a vehicle seat according to certain aspects of the disclosure. According to one aspect, the lordosis support comprises a bend-resistant pressure plate in essentially the transverse direction of the seat which forms a supporting surface in the lordosis region of the back rest and is arranged between two side frame parts of the seat frame, wherein there is at least one holding element that extends between the frame parts with a length-variable adjustment section, which runs in the Y-direction and supports the pressure plate, and is affixed there at fixing points arranged opposite each other. In an inoperative position, the pressure plate is arranged with a horizontal clearance behind the fixing points, wherein there is a driving device with which the length of the adjustment section can be shortened as the horizontal clearance is reduced. The shortening of the adjustment section moves the pressure plate forward, thus curving the cushioning of the back rest. Due to the rigidity of the seat plate, the contour of the lordosis region of the back rest remains essentially unchanged during this process. In contrast, for example, in the seats known from U.S. Pat. No. 6,676,214 B2, the element effecting the curving is flexible, so that changes to the contour of the lordosis region of the back rest depend upon the degree of the curving. The at least one holding element runs preferably along the back side of the pressure plate, so that the plate can securely brace itself against the holding element when the seat is supporting a passenger's weight. Furthermore, with the specified arrangement, one avoids a relative movement between the back rest cushioning and the holding element, which is being shortened or moved back into its starting position.

By providing two holding elements that are spaced apart from each other in the vertical direction, the design achieves both a curve in the lordosis region and a curving movement in the vertical direction, that is, from the bottom to the top and vice versa. Lordosis supports with this type of flexibility may be considered to provide a 4-way lordosis support. The vertical curving movement of the back rest in the lordosis region is achieved by simply shortening and controlling the holding elements independent of each other and time-delayed.

In the case of a single holding element, as well as two holding elements, the pressure plate is reset to its starting position by the weight of the seat's user and also by the tension increasing in the cushioning and the back rest covering when the contour of the back rest is curved. Thus, the holding element can also be reset to its starting position, that is, it can be lengthened after it was previously shortened. Preferably, the holding element comprises a spring element. This increases the seat's comfort and also acts as an overload element.

In an embodiment, a holding element comprises two spring elements, each of which has a first and a second end, wherein the first end is always affixed to a side frame part and the second ends are connected to each other via a connecting element whose length can be reduced using a driving device. When the length of the connecting element is reduced, the adjustment region of the holding element is shortened and the pressure plate is moved forward accordingly.

In a first variant, the connecting element is a Bowden cable made of an internal cable and a casing. The casing is braced against the second end of one of the spring elements, wherein the end of a section of the internal cable, which protrudes from the casing, is affixed to the second end of the other spring element. In this manner, which is technically easy to implement, the second ends of the spring elements can thus be brought close together or, respectively, the adjustment section of the holding element extending between the side frame parts of the back rest can be shortened.

In a second variant, the connecting element is essentially composed of a motor-driven turnbuckle whose ends are connected with the helical extension springs. Particularly with respect to the technical assembly issues, it is advantageous if at least one unit comprising a turnbuckle and a motor is arranged in a shared housing affixed to the back side of the pressure plate.

In order to affix the pressure plate on the holding element, the design provides a receptacle on the back side of the pressure plate which extends over at least part of the width of the pressure plate and in which the internal cable of the Bowden cable is guided basically free of backlash. This prevents the internal cable from vibrating during vehicle operation, which can lead to body rattle.

The curving area in the lordosis region of the back rest does not extend over the entire width of the back rest, but is rather limited to a middle section of the back rest. Accordingly, the pressure plate does not fill the entire available space between the side frame parts in the transverse direction of the vehicle; rather, there is a space between the pressure plate and the aforementioned frame parts. As already mentioned above, the pressure plate is hung on the side frame parts with the spring elements. If the spring elements are helical extension springs, as is provided in one design, there is the risk that the spring elements, which work in the transverse direction of the seat, will damage the cushioning material. In order to avoid this, appendages, which extend in the transverse direction of the seat and at least partially cover the spring elements, are attached to the side edges of the pressure plate.

When the adjustment section of the holding element is shortened, the pressure plate is moved forward, thus increasing the angle that is formed by the holding element sections extending between the side frame parts and the side edges of the pressure plate, that is, especially the spring elements with the planar level of the pressure plate. In order to change the angularity of the aforementioned holding element section during the forward and backward movement of the pressure plate in an essentially unimpeded manner, the appendages are hinged to the pressure plate in such a way that their angularity to the planar level of the pressure plate can be changed. This is ensured, for example, in that either the appendages are designed to be completely flexible or only the connection between the appendages and the pressure plate is designed to be flexible. It is conceivable, for example, that the appendages are formed over a film hinge, that is, a thinned area of material on the pressure plate. A cross connection of the appendages and the spring elements, particularly those designed as helical extension springs, is ensured by having a receptacle on the back sides of the appendages that holds a spring element which has a positive locking that works only in the longitudinal direction of the vehicle. This guarantees coupling of motion between the spring element and the appendage during a forward or return stroke of the pressure plate, without the relative mobility between the appendage and spring element thereby being compromised in the transverse direction of the seat.

In the area of the back rest located above the pressure plate, another plate is affixed to the frame and serves to support the back rest cushioning; the plate is therefore hereinafter referred to as the supporting plate. It is, of course, conceivable for the supporting plate to be a part that is independent of and separate from the pressure plate. In one design, however, the supporting plate is connected to the upper edge of the pressure plate. This increases the stability of the entire back rest structure, wherein a flexible mounting is ensured by the supporting plate being affixed to the side frame parts with spring elements, particularly helical extension springs. In order to guarantee an essentially independent adjustment of the pressure plate despite the connection of the two plates, in one embodiment, the supporting plate is hinged to the pressure plate, for example, it is connected to the pressure plate by a hinged joint. Alternatively, or in addition to this embodiment, the supporting plate is designed to be somewhat flexible in the vertical direction, for example, using through holes or an appropriate material strength.

In another embodiment, on the back side of the pressure plate and/or the supporting plate, at least one fan is arranged whose exhaust opening penetrates the supporting plate or the pressure plate. In this way, the back rest can be cooled or warmed, especially in the lordosis region, by blowing in warm or cold air.

A driving device for a holding element, which is generally an electric motor that is equipped, if necessary, with a gearbox, can be attached to the side frame parts. In one embodiment, however, the drive is arranged on the back side of the pressure plate or the supporting plate. This is advantageous in that the pressure plate, along with all required components, such as, the holding element, spring elements, mounting plate, and driving device, can be prefabricated as a unit, so that, basically, when the seat is assembled, this unit only needs to be hung into the back rest frame. The same applies especially to the above-mentioned variant in which the turnbuckle and motor are arranged in a shared housing affixed to the back side of the pressure plate.

BRIEF DESCRIPTION OF THE DRAWINGS

The disclosure will now be explained in more detail by referring to the enclosed drawings: Shown are.

DETAILED DESCRIPTION

Figure 1:
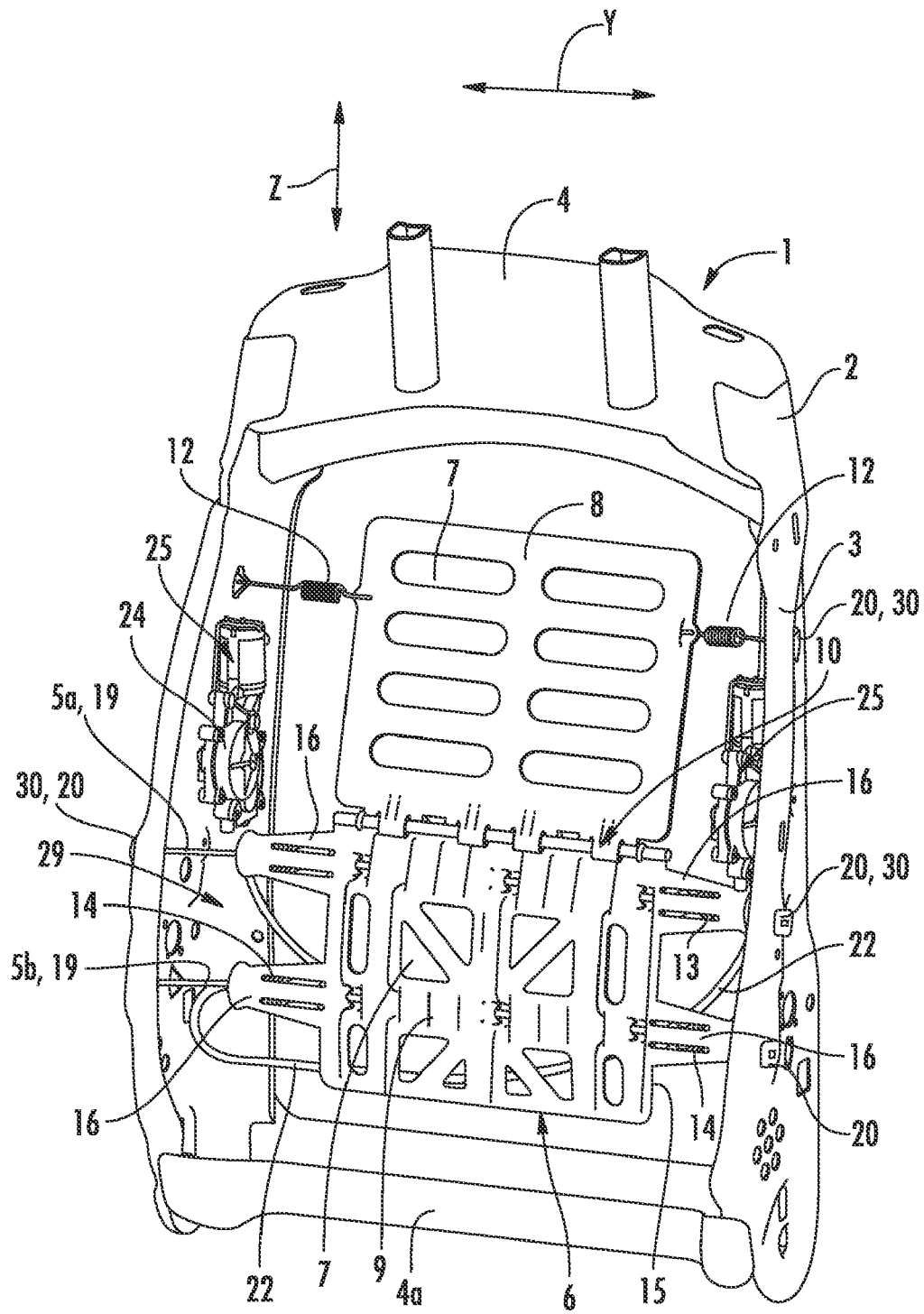
FIG. 1 a top front perspective view of a back rest framework of a vehicle seat assembly with a fitted lordosis support, FIG. 2 a front view of the lordosis support of the seat assembly of FIG. 1, FIG. 3 a side view of the lordosis support of FIG. 2, FIG. 4 a detail view of a portion of the lordosis support of FIG. 2 shown in perspective, FIG. 5 a rear view of the lordosis support of FIG. 2, FIG. 6 a front view of a second embodiment of a lordosis support, in which an adjustment is made using only one motor, FIG. 7 a side view of the lordosis support of FIG. 6, FIG. 8 a front view of a third embodiment of a lordosis support, in which fans are arranged in the supporting plate and the pressure plate, FIG. 9 a front view of a fourth embodiment of a lordosis support, in which the pressure plate and the supporting plate are connected as a single piece, FIG. 10 a front view of a fifth embodiment of a lordosis support, in which fans are arranged in the pressure plate and in the supporting plate, FIG. 11 a front view of a sixth embodiment of a lordosis support in which an adjustment is made using a counterrotating spindle drive, FIG. 12 a perspective view of a detail of the lordosis support FIG. 11
Figure 2:
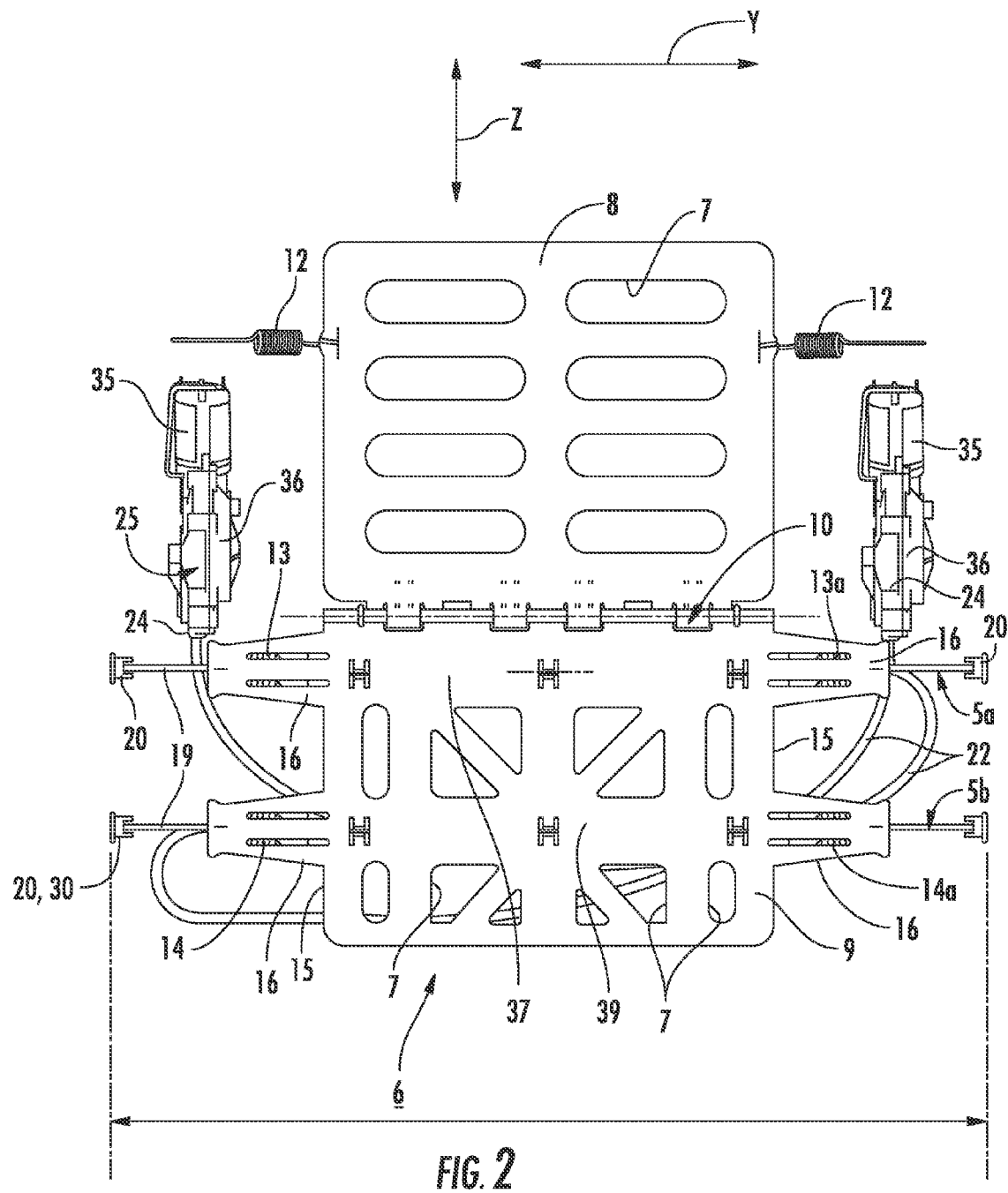

Detailed reference will now be made to the drawings in which examples embodying aspects of the present invention are shown. The detailed description uses numerical and letter designations to refer to features in the drawings. Like or similar elements in the drawings and description have been used to refer to like or similar parts of the embodiments.

The drawings and description provide a full and detailed written description of the invention, and of the manner and process of making it and using it, so as to enable one skilled in the art to make and use it, as well as the best mode of carrying out the invention. However, the examples set forth in the drawings an description are provided by way of explanation and not by way of limitation. Thus, the present disclosure is directed to inventions including any modifications and variations of the following examples as come within the scope of the appended claims and their equivalents.

FIG. 1 shows the back rest framework 1 of a vehicle seat, which essentially comprises a closed frame made of plastic or metal. The frame is made of two side frame parts 3, as well as an upper and a lower cross brace 4, 4a. The lordosis support 6 itself essentially comprises two somewhat plate-like parts equipped with through holes 7, namely a supporting plate 8 and a pressure plate 9. The supporting plate 8 is connected to the pressure plate 9 by means of a hinged joint 10. The supporting plate is always hung in a side frame part 3 with a helical extension spring 12. Two holding elements 5a, 5b, which are spaced apart vertically, are provided for adjustable holding of the pressure plate 9. These always include two, somewhat screw-shaped, wound helical extension springs 13, 14. The pressure plate 9 is affixed with these to the side frame parts 3. Between the side edges of the pressure plate 9 and the side frame parts 3, there is a space 29 through which the helical extension springs 13, 14 extend. Appendages 16, which extend in the transverse direction of the seat (also called herein the Y-direction) and at least partially cover the helical extension springs 13, 14, are arranged on the side edges of the pressure plate 9. The appendages 16 are hinged in such a way on the pressure plate 9 that their angularity to the planar level of the pressure plate can be adjusted, which is accomplished by means of an attenuation point or a film hinge (not shown). On their back sides, the appendages 16 have a receptacle 17 that holds the helical extension springs 13, 14, with a positive locking that works mainly in the longitudinal direction of the vehicle (the X-direction). This prevents the user from feeling the helical extension springs 13, 14 as uncomfortable pressure points or the springs from damaging the cushioning material. Furthermore, the embodiment being described also serves to affix the pressure plate 9 in the back rest frame, thus preventing shocks and vibrations. The receptacle 17 extends somewhat in the Y-direction and is bounded by two expandable spring tongues 18 for inserting a helical extension spring 13, 14.

Figure 3:
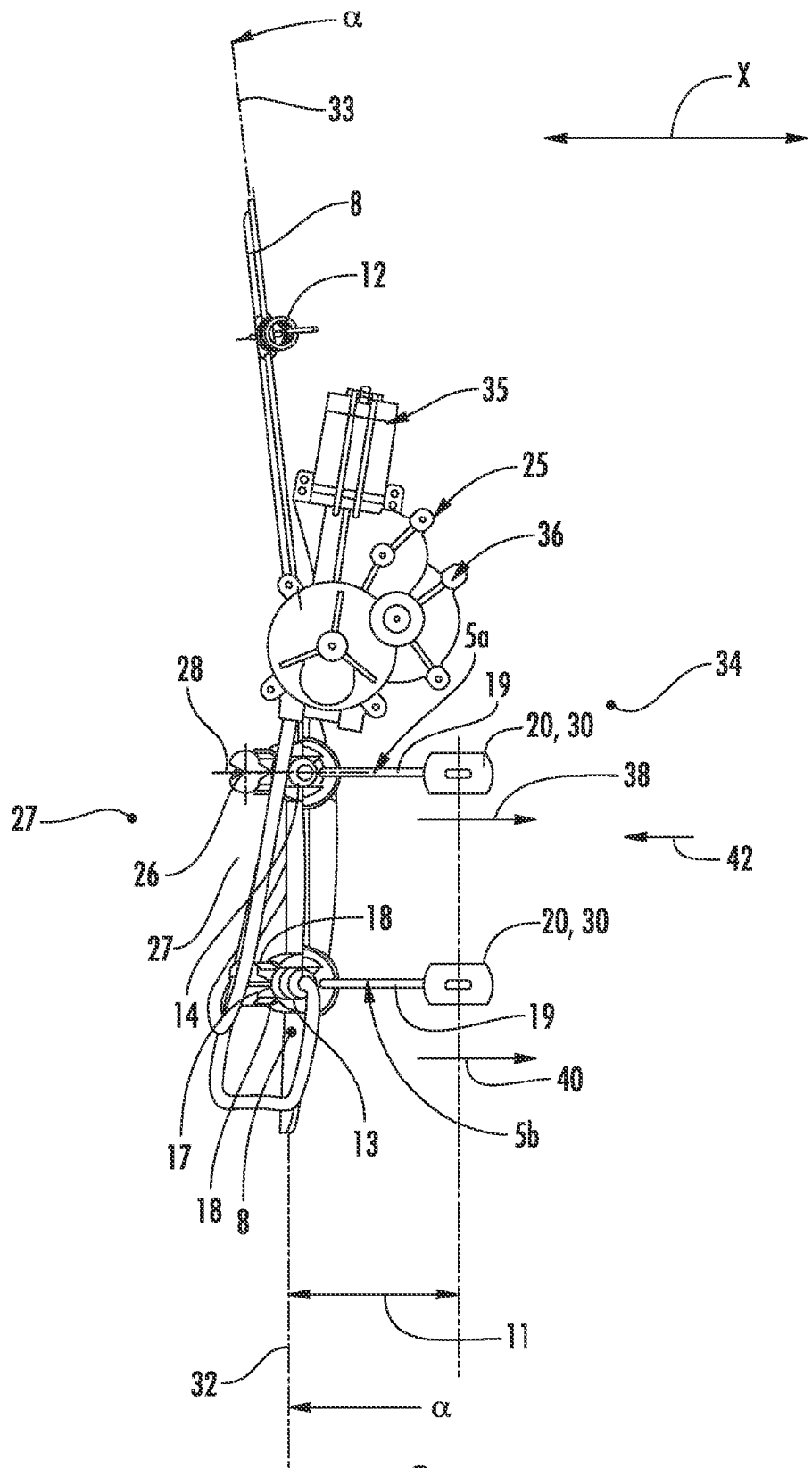
Figure 4:
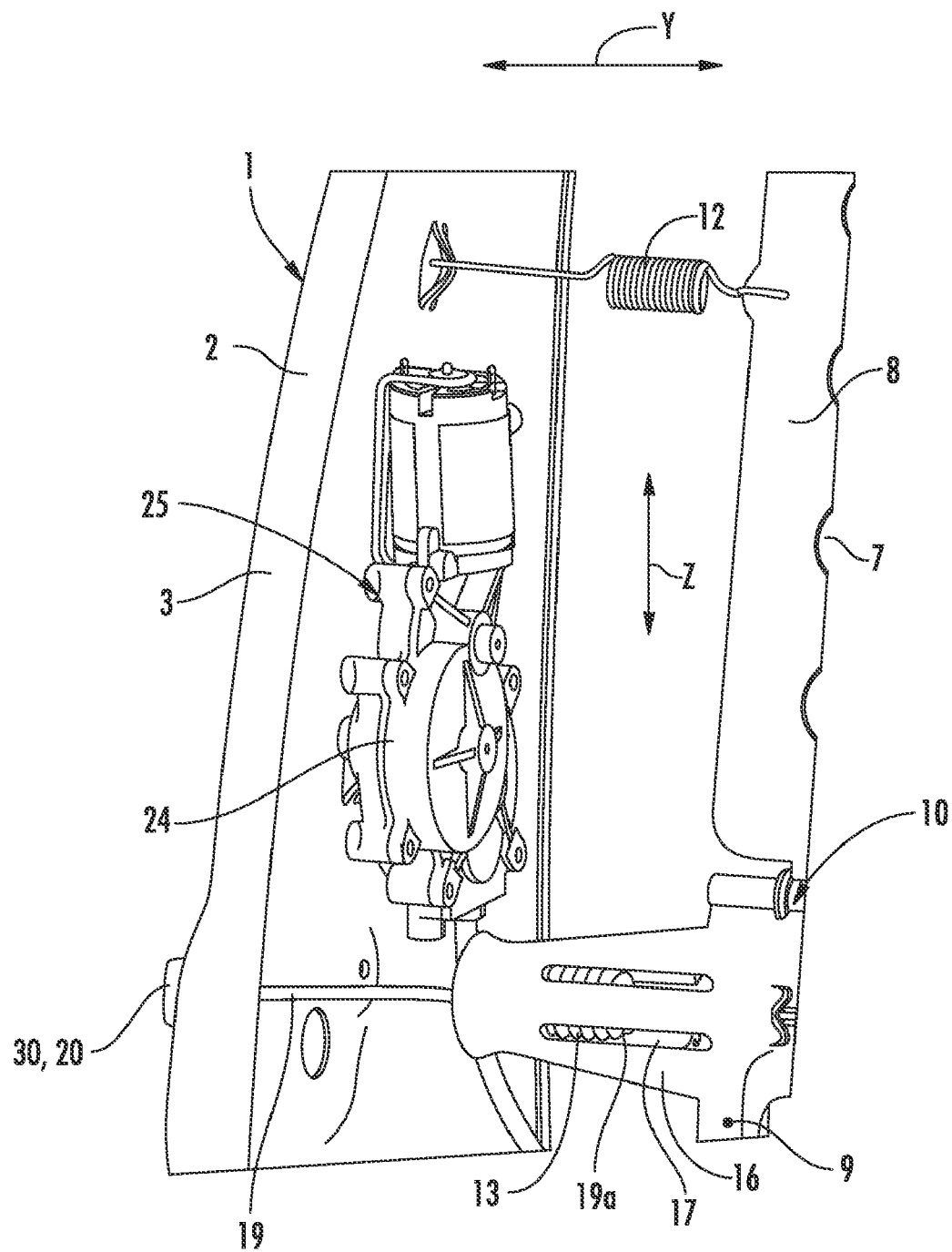
Figure 5:
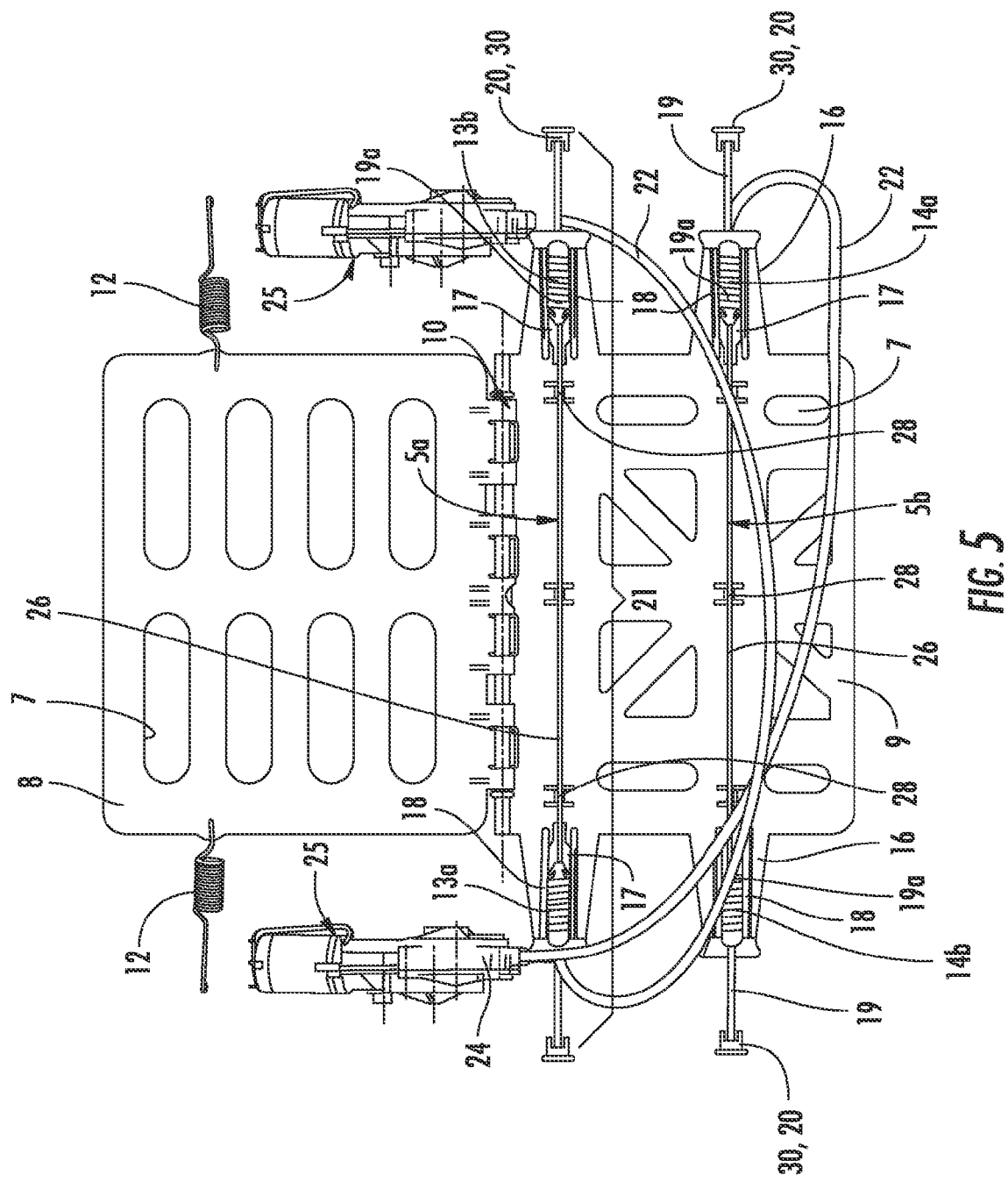

The spring end 19 of the helical extension springs 13, 14 pointing away from the pressure plate 9 basically extends rectilinearly away from the helical extension springs and is affixed with a clip 20 in an opening of a frame part 3. In the relaxed position of the helical extension springs or in an inoperative position of the pressure plate, the spring ends 19 extend forward at a slant, relative to the Y-direction, thus encompassing an angle with the Y-direction that opens to the front, which can best be seen in FIG. 3. Here, the pressure plate 9 is in an inoperative position in which a horizontal clearance 11 existing at the side frame parts 3, between the plate and the fixing points 30 (clips 20) of the spring ends 19, is at its maximum. This is reduced, thereby moving the pressure plate 9 forward when the adjustment region 21 extending between the fixing points 30 shortens. In the embodiments shown in the drawings, this is accomplished by bringing the spring ends 19a that point to one another close together. For this purpose, they are connected by a connecting element that can be shortened using a motorized drive.

In the embodiments shown in FIGS. 1 to 10, the connecting element is a Bowden cable 22, which connects two opposing helical extension springs 13 or 14 to each other. The casing 23 of the Bowden cable 22 is supported, on the one hand, by the housing 24 of an electric drive unit 25 arranged on a frame part 3 and, on the other hand, by a spring coil of a helical extension spring 13a, 14a (FIG. 5) that is connected to the spring end 19. The internal cable 26 of the Bowden cable 22 extends beyond the back side 27 of the pressure plate 9 up to the respectively opposing helical extension springs 13b or 14b. On the back side 27 of the pressure plate, the internal cable 26 lies in at least one receptacle groove 28.

When the helical extension springs are in the relaxed position, the pressure plate 9 is in a retracted position, wherein the horizontal clearance 11 (FIG. 3) is at its maximum. The planar level 32 (FIG. 3) of the pressure plate 9, together with the planar level 33 of the supporting plate 8, thus form an obtuse angle α opening to the front side of the back rest framework 1. The aforementioned electrical drive units 25 are used to move the pressure plate 9 from this position. These units comprise an electric motor 35 and a gearbox 36. The gearbox 36 contains a roller (not visible) for winding up the internal cable 26.

In the embodiment with two drive units 25 shown in FIGS. 1 to 5, the following adjustment options are available. If, in the case of the upper holding element 5a, the internal cable 26 is pulled into the casing 23 of the Bowden cable 22, its area extending between the helical extension springs 13 is shortened. As a result of this, the upper area 37 of the pressure plate 9 is swiveled forward, according to arrow 38 in FIG. 1, wherein the lower holding element 5b forms a swivel axis. Due to the hinged joint 10 between the pressure plate 9 and the supporting plate 8, the latter is swiveled slightly forward in the direction of the arrow 38, wherein the helical springs 12 serve as the swivel axis. If the lower holding element 5b is shortened in the described manner, the lower area 39 of the pressure plate 9 moves analogously forward in the direction of the arrow 40. The upper area 37 and the lower area 39 can also be moved forward in the direction of the arrows 38, 40 either simultaneously or time-delayed, in order, for example, to achieve a massage function by using a control device. In all of the aforementioned cases, the pressure plate 9 is returned to its position when the internal cable 26 is pulled out of the casing 23 by the relaxing helical extension springs 13 as the motor 35 on the gearbox 36 is rotated in the opposite direction. The pressure plate 9 is moved into its inoperative position by the weight of a seat user. In addition to the aforementioned movement options, the upper area 37, like the lower area 39, can be operated the opposite way, that is, in such a way that the lower area moves forward in the direction of the arrow 40 and the upper area moves backwards in the direction of the arrow 42 and vice versa. This can create pressure zones or pressure waves that move from the top down or from the bottom up.

Figure 6:
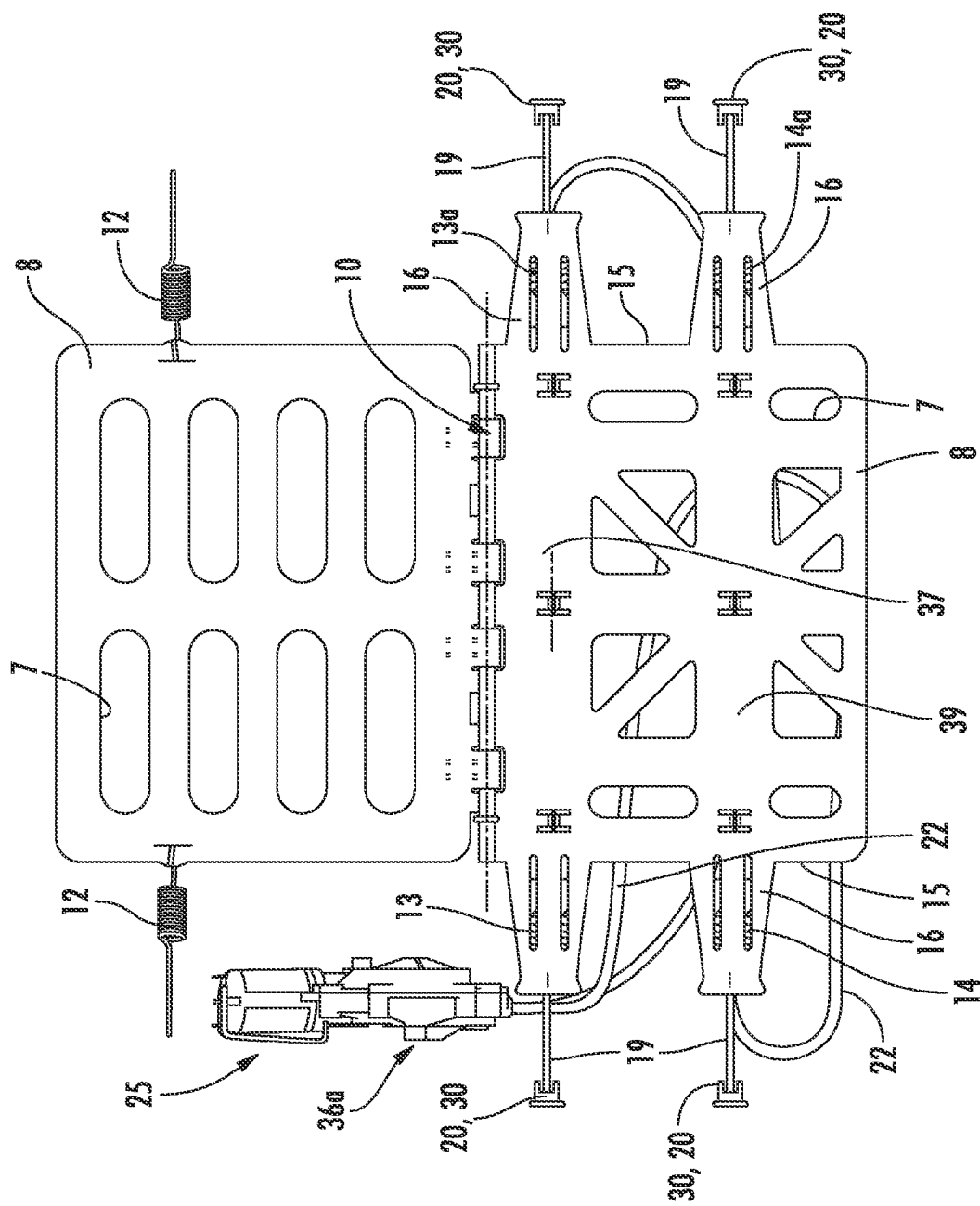
Figure 7:
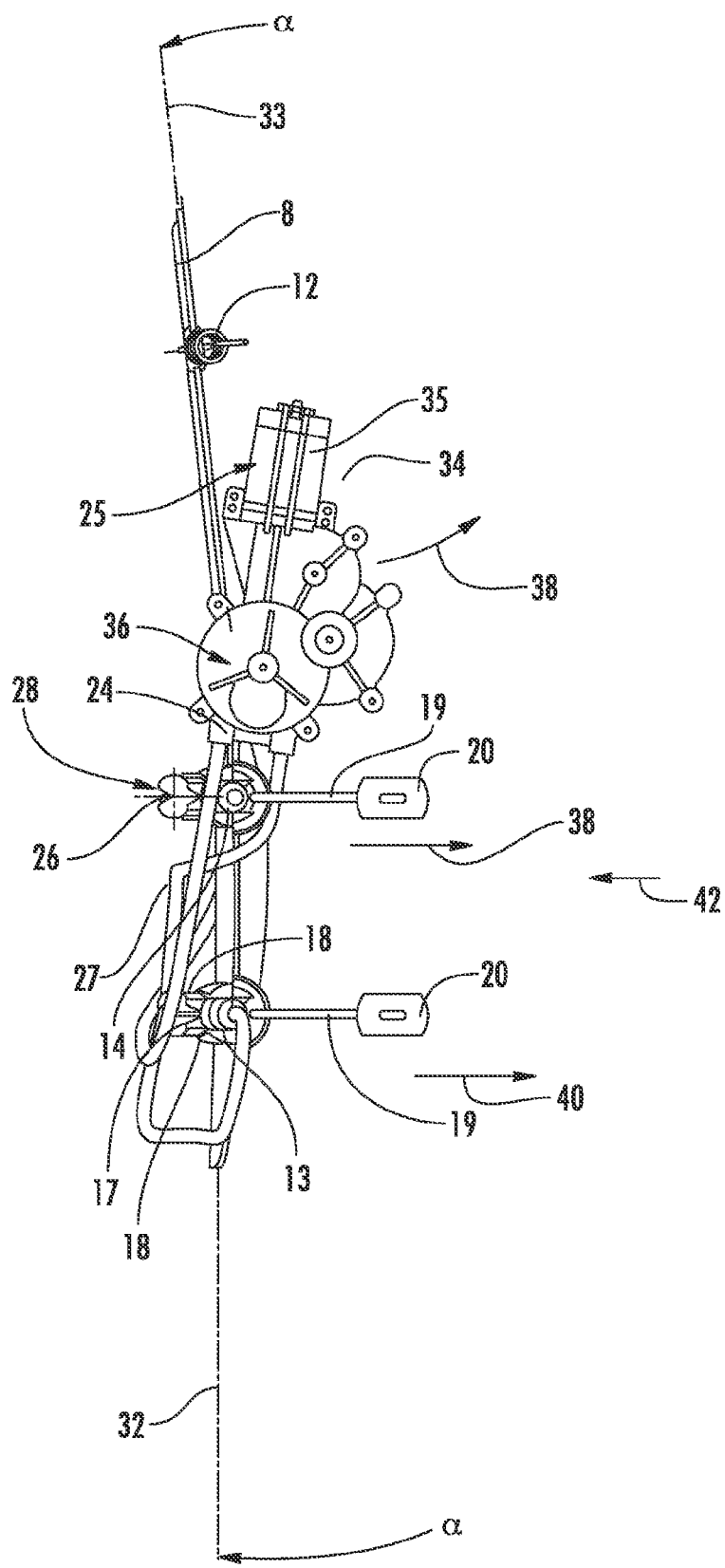

In the embodiment shown in FIGS. 6, 7, there is only one drive unit 25. Its gearbox 36a is designed in such a way that it can grasp the internal cables 26 of two Bowden cables 22 simultaneously and roll them up onto one spool using opposite winding directions. An adjustment is made starting from a middle position at which both helical extension spring pairs 13 or 14 are partially stretched. With this embodiment type, a simultaneous forward or backward movement of the upper area 37 and the lower area 39 is not possible. The aforementioned areas can, however, be alternately moved forward.

Figure 8:
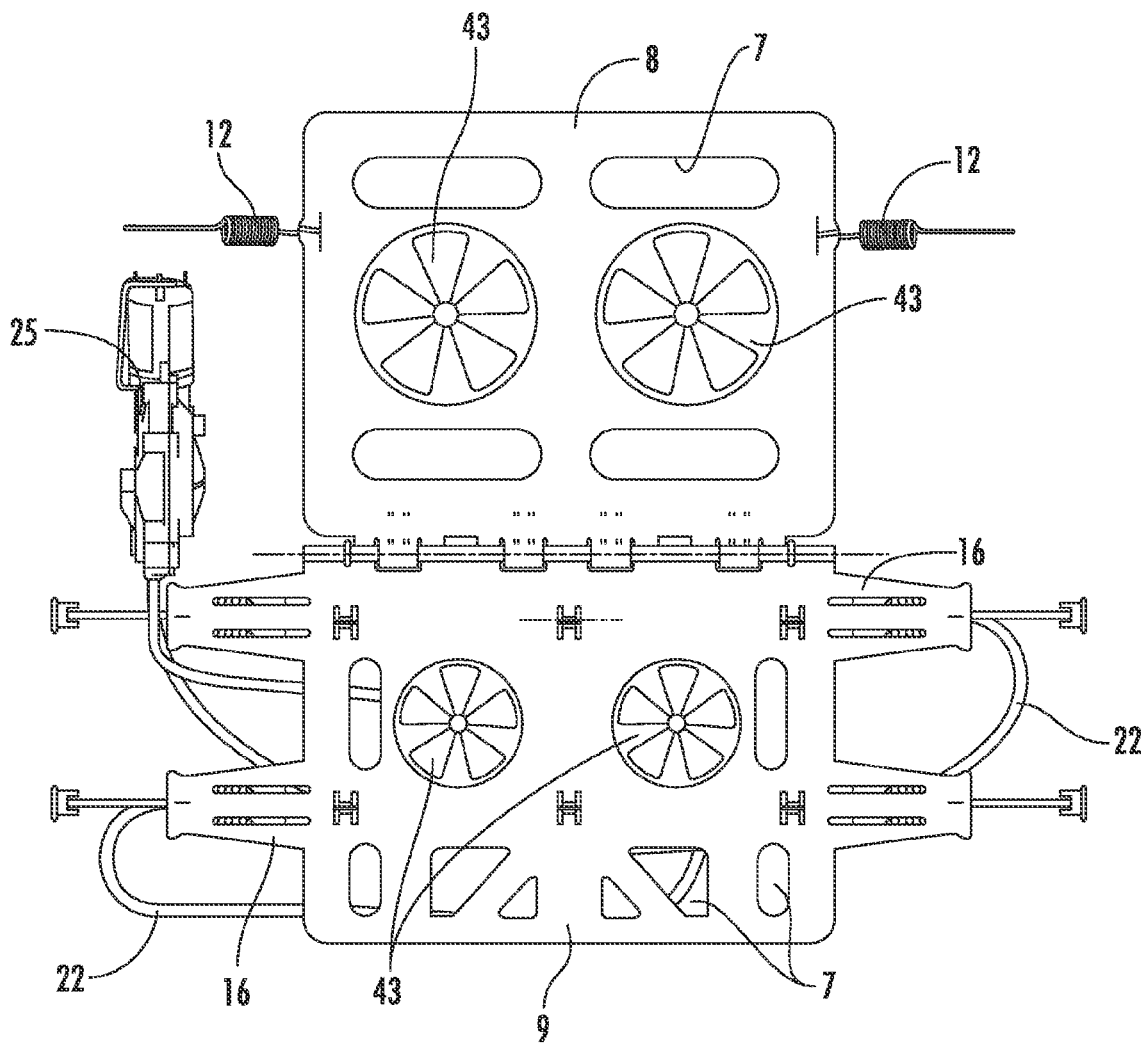

In FIG. 8 an embodiment is shown in which fans are arranged in the supporting plate 8 and in the pressure plate 9. With this design, air can be suctioned or pressed through a cushioned area arranged in front of the lordosis support, so that this area is cooled.

Figure 9:
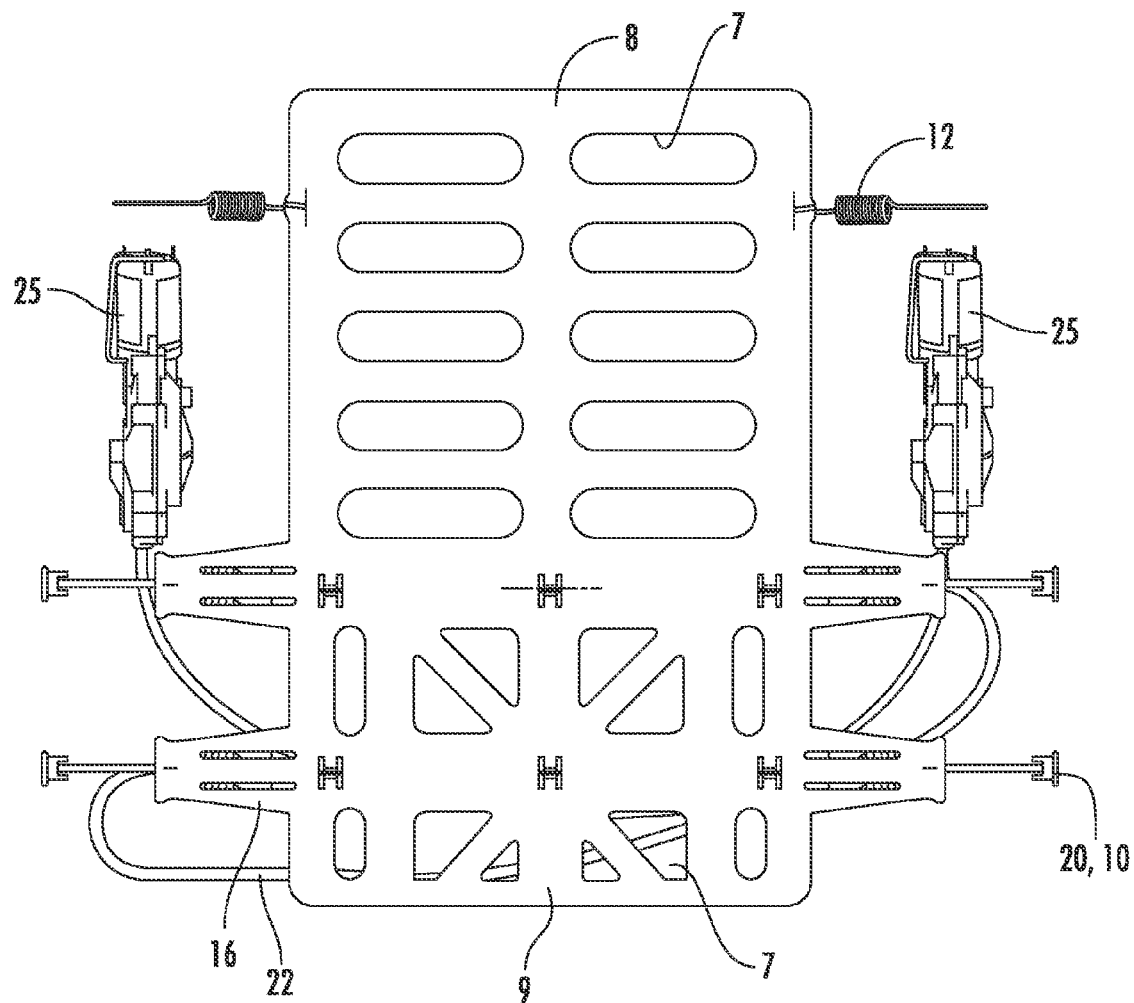
Figure 10:
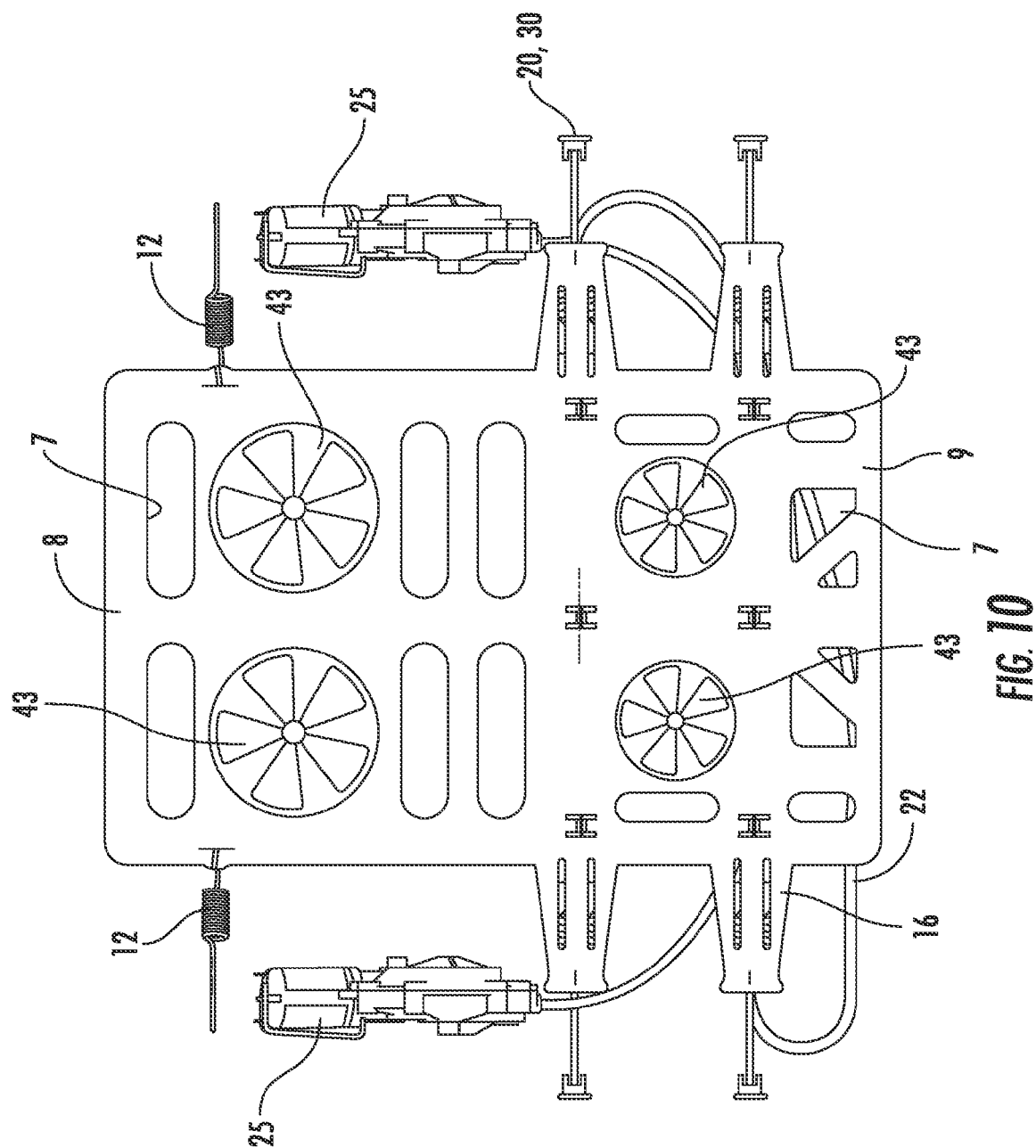

In FIG. 9, an embodiment is shown in which the supporting plate 8 is connected as one piece to the pressure plate 9. As can be seen in FIG. 10, here there can also be fans 43 in the supporting plate 8 and in the pressure plate 9. It is, of course, also conceivable that the fans 43 are present in only one pressure plate 9 or in only one supporting plate 8. Instead of fans, other components, for example, switching devices, cushion fasteners, etc., can also be affixed to the pressure plate 9 and/or the supporting plate 8.

Figure 11:
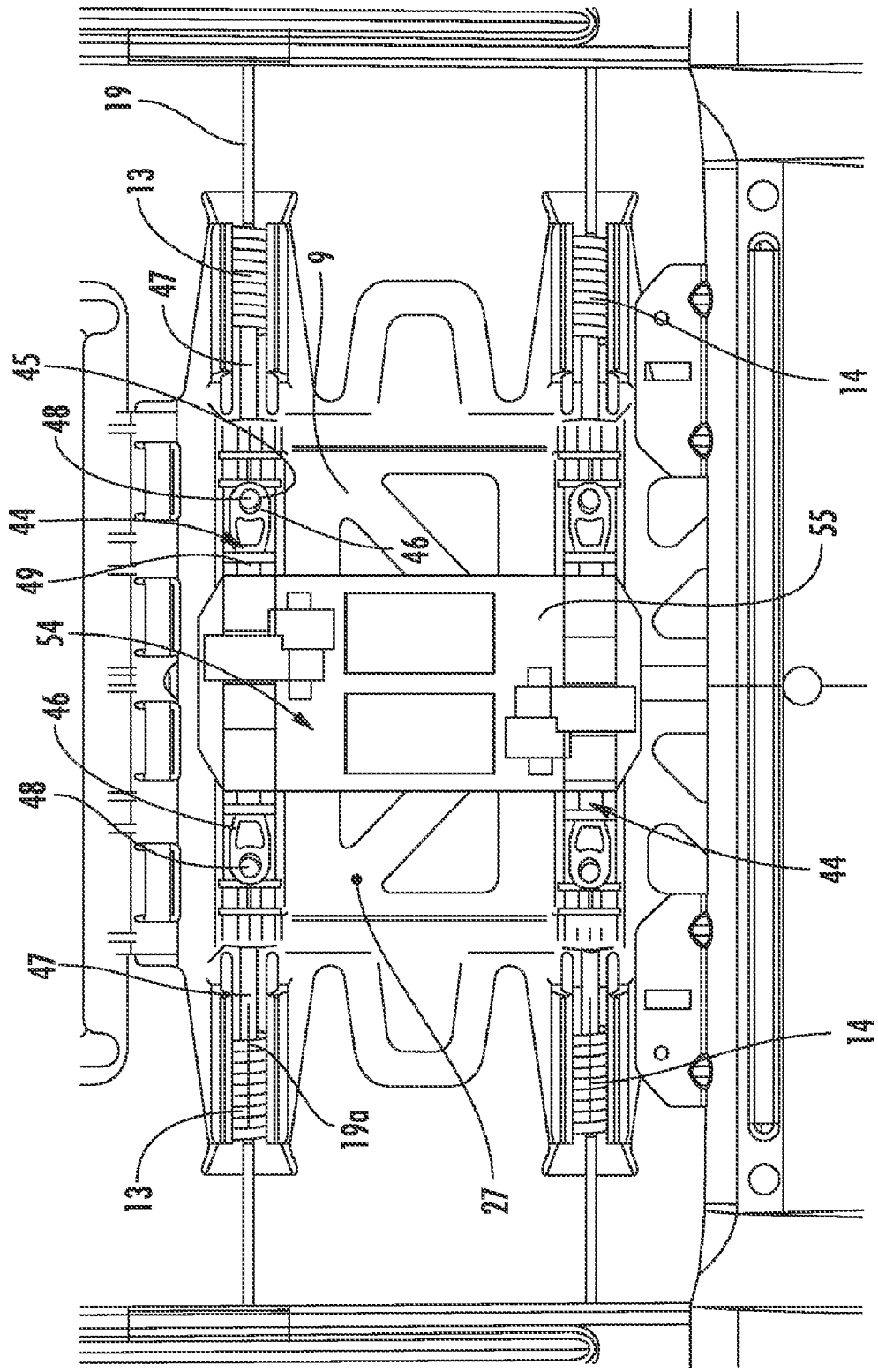
Figure 12:
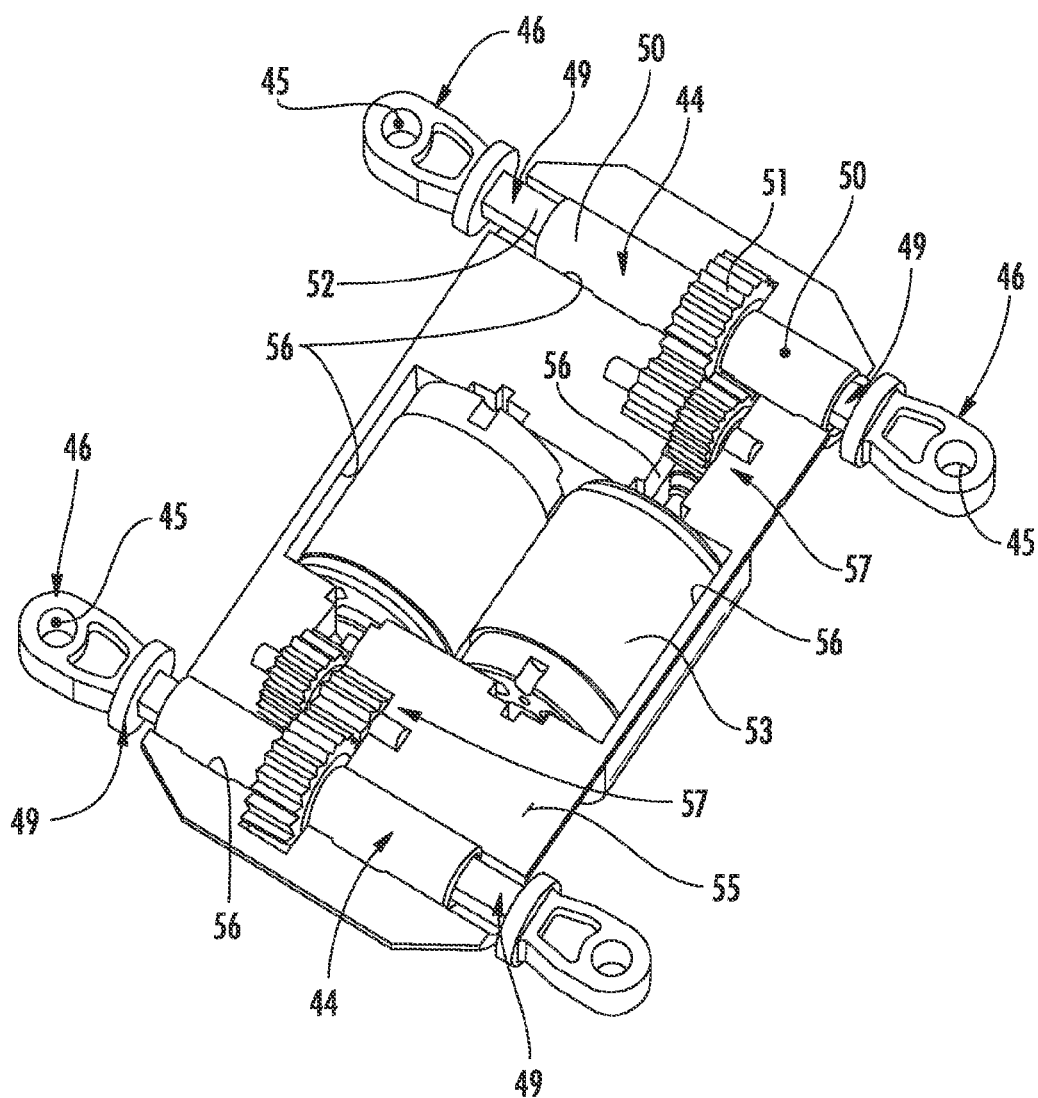

In the section of the embodiment shown in FIG. 11, the ends 19a of the helical extension springs 13, 14 used for adjusting the pressure plate 9 are always moved toward one another using a turnbuckle 44. A turnbuckle 44 has two ends 46, each of which always has an eyelet 45. A connector 47 that, on one of its ends, has a projection 48 that meshes into an eyelet 45 and, on the other end, is connected to a helical extension spring 13, 14, always extends between the ends 46 and the springs 13. As can be seen in FIG. 12, a turnbuckle basically comprises two spindles 49, each of which has an end 46, and two sheaths 50. These always have an internal thread (not visible) that works together with the threads of the spindles 49. The two sheaths 50 are affixed to each other with a torque-locked connection. One of the two sheaths 50 has a gear-wheel 51 with which both sheaths 50 can be rotated. The respective threads of the spindles 49 and sheaths 50 are inversely arranged, so that, during a rotation of the gear-wheel 51, the ends 46 move either away from, or toward, each other. On the spindles 49, there are flat areas 52 that serve to fix the rotation of the spindles 49. In the embodiment in FIG. 11, each holding element 5a, 5b comprises a turnbuckle 44. The two turnbuckles, along with the electric motors 53 assigned to them, are housed in a shared housing 54, which is affixed to the back side of the pressure plate 9. The housing 54 comprises two covers 55 that have recesses 56 for accommodating the electric motors 53 and the turnbuckles 44. The electric motors 53 are always connected to the gear-wheel 51 of a turnbuckle 44 via a gearbox 57, wherein the gearboxes 57 are likewise arranged in recesses 56 of the covers 55.

While preferred embodiments have been shown and described, those skilled in the art will recognize that other changes and modifications may be made to the foregoing embodiments without departing from the scope and spirit of the invention. Specific shapes and dimensions of various elements can be altered for particular applications, and aspects of different embodiments can be combined to reach still further embodiments. It is intended that all such alterations are within the scope of the invention, as defined by the appended claims and their permissible equivalents.

The invention claimed is:

1. Vehicle seat comprising: a back rest having a frame with two side parts;
a lordosis support
having a pressure plate that is substantially bend-resistant in at least the horizontal transverse direction of the seat, forms a supporting surface in the lordosis region of the back rest and is arranged between the two side parts of the frame;
two holding elements spaced apart from each other in the vertical direction, each holding element extending between the side parts with a length-variable adjustment section that runs in the horizontal transverse direction and connects to the pressure plate, and the holding elements being affixed to the side parts at fixing points arranged opposite each other,
the pressure plate being positioned by the holding elements in an inoperative position with a clearance in the horizontal longitudinal direction behind the fixing points; and
a driving device with which the length of the adjustment section can be shortened to thereby reduce the clearance in the horizontal longitudinal direction.

2. Vehicle seat according to claim 1, wherein the holding element is arranged on the back side of the pressure plate.

3. Vehicle seat according to claim 1, wherein the lengths of the adjustment sections can be varied independent of each other.

4. Vehicle seat according to claim 1, wherein each holding element has at least one spring element including a helical extension spring.

5. Vehicle seat according to claim 4, wherein each of the holding elements includes two spring elements, each of which has a first end and a second end, wherein the first end is always affixed to a respective side part and the second ends are connected to each other via a connecting element whose length can be reduced using the driving device.

6. Vehicle seat according to claim 5, wherein the connecting element is a Bowden cable made of an internal cable and a casing.

7. Vehicle seat according to claim 6, wherein the casing is braced against the second end of one of the spring elements and the end of a section of the internal cable, which protrudes from the casing, is affixed to the second end of the other spring element.

8. Vehicle seat according to claim 6, wherein on the back side of the pressure plate, there is a receptacle groove extending over at least part of the width of the pressure plate, in which the internal cable of the Bowden cable is guided substantially free of backlash.

9. Vehicle seat according to claim 5, wherein the connecting element is a motor-driven turnbuckle, whose ends are connected with the helical extension springs.

10. Vehicle seat according to claim 9, wherein at least one existing unit comprising a turnbuckle, a gearbox, and an electric motor is arranged in a shared housing affixed to the back side of the pressure plate.

11. Vehicle seat according to claim 4, wherein appendages, which extend in the horizontal transverse direction and at least partially cover the spring elements, are attached to the side edges of the pressure plate.

12. Vehicle seat according to claim 11, wherein the appendages are hinged on the pressure plate in such a way that their angularity to the planar level of the pressure plate can be changed.

13. Vehicle seat according to claim 11, wherein the appendages have a receptacle on their back side that holds the spring element which has a positive locking that works in the longitudinal direction of the vehicle.

14. Vehicle seat according to claim 11, wherein each holding element is assigned a separately controllable driving device.

15. Vehicle seat according to claim 11, wherein a supporting plate is connected to the upper edge of the pressure plate.

16. Vehicle seat according to claim 15, wherein the supporting plate is affixed to the side frame parts with spring elements.

17. Vehicle seat according to claim 15, wherein the supporting plate is hinged to the pressure plate.

18. Vehicle seat according to claim 15, wherein the supporting plate is flexible in the vertical direction.

19. Vehicle seat according to claim 15, wherein on the back side of at least one of the pressure plate and the supporting plate, a fan is arranged whose exhaust opening penetrates the at least one of the supporting plate or the pressure plate.

* * * * *